(12) United States Patent
Abram et al.

(10) Patent No.: US 6,462,778 B1
(45) Date of Patent: Oct. 8, 2002

(54) METHODS AND APPARATUS FOR ASSOCIATING DESCRIPTIVE DATA WITH DIGITAL IMAGE FILES

(75) Inventors: Philip Michael Abram, New York, NY (US); Robert J. Sato, Fort Lee, NJ (US)

(73) Assignees: Sony Corporation, Tokyo (JP); Sony Electronics, Inc., San Diego, CA (US)

(*) Notice: Subject to any disclaimer, the term of this patent is extended or adjusted under 35 U.S.C. 154(b) by 0 days.

(21) Appl. No.: 09/258,813

(22) Filed: Feb. 26, 1999

(51) Int. Cl.[7] .............................................. H04N 5/225
(52) U.S. Cl. ................................. 348/239; 348/333.02
(58) Field of Search ................................ 348/207, 231, 348/232, 233, 239, 333.01, 333.02; 704/3, 251, 254, 276, 260, 257; 396/429, 310, 312; 382/100, 306; H04N 5/225

(56) References Cited

U.S. PATENT DOCUMENTS

| | | | | |
|---|---|---|---|---|
| 5,335,072 A | * | 8/1994 | Tanaka et al. ............... | 348/232 |
| 5,345,309 A | | 9/1994 | Wertz et al. | |
| 5,477,511 A | * | 12/1995 | Englehardt .................... | 704/251 |
| 5,633,678 A | * | 5/1997 | Parulski et al. ............. | 348/231 |
| 5,692,225 A | * | 11/1997 | Bernardi et al. ............ | 396/310 |
| 5,734,794 A | * | 3/1998 | White ......................... | 704/275 |
| 5,796,428 A | * | 8/1998 | Matumoto ................... | 348/231 |
| 5,825,408 A | | 10/1998 | Yuyama et al. | |
| 5,974,386 A | * | 10/1999 | Ejima et al. ................. | 704/276 |
| 6,012,028 A | * | 1/2000 | Kubota et al. ............... | 704/260 |
| 6,064,959 A | * | 5/2000 | Young et al. ................ | 704/251 |
| 6,111,605 A | * | 8/2000 | Suzuki ......................... | 348/231 |
| 6,128,446 A | * | 10/2000 | Schrock et al .............. | 396/310 |

* cited by examiner

*Primary Examiner*—Tuan Ho
(74) *Attorney, Agent, or Firm*—Finnegan, Henderson, Farabow, Garrett & Dunner, L.L.P.

(57) ABSTRACT

Methods and systems for labeling digital image data generated by digital imaging devices, such as digital cameras and camcorders, with descriptive information are disclosed. In one embodiment, a menu of descriptive terms is displayed to the user of the digital imaging device. The user chooses one or more of the descriptive terms and the user's choices are associated with the digital image data. The descriptive terms may be used, for example, to generate a file name or may be later displayed with the digital image. In another embodiment, the digital imaging device accepts audio input such as, for example, the user speaking descriptive labels into a microphone. Using speech processing techniques, descriptive terms are extracted from the audio input and associated with the digital image data. In yet another embodiment, the digital imaging device accepts information from a location determination device, such as a GPS system. The location information may be used to determine alphanumeric location labels that can then be associated with the digital image data.

7 Claims, 8 Drawing Sheets

METHODS AND APPARATUS FOR ASSOCIATING DESCRIPTIVE DATA WITH DIGITAL IMAGE FILES

BACKGROUND OF THE INVENTION

The present invention relates generally to methods and apparatus for improving digital image processing.

Digital imaging devices, such as digital cameras and scanners, create digital representations of images and store the digital representations to data files for future use and manipulation. Data file names are created either automatically or entered in manually by the user. Conventional digital imaging devices that create filenames automatically typically use consecutive alphanumeric filenames, such as "xxx0001.jpg" and "xxx0002.jpg", to label the data files. While the files are labeled automatically, the file name created by the device has no relevance to the contents or description of the image. Nondescriptive filenames make organizing, indexing, sorting and retrieval of these files difficult and time consuming.

Some conventional imaging devices allow the use of descriptive file names, but these file names must be entered by the user. In conventional scanning devices, for example, pages to be scanned are loaded into a document feeder. The user specifies scan settings, including a file name for the stored image. The user must enter a descriptive name, such as "capecod1." When the user indicates that the desired settings are chosen by, for example, pressing a button, the scanned image is then saved as the indicated file name.

Some conventional digital cameras create a file name for the image file using data from an internal clock that is used also for automatic time stamping. These conventional devices may create, for example, an alphanumeric file name for a standard JPEG file of 050198182350.JPG for an image created on May 1, 1998 at 6:23 pm 50 seconds. The date and time information may also be integrated with the digital image information. This information is useful for retrieving an image based on date and time of creation. Conventional automatic digital imaging devices, however, do not stamp a digital image recording with other information useful for recalling an image, such as the location of the capture or the event associated with the image, such as a picnic, birthday or other event.

Some commercially available digital cameras are combined with global positioning system (GPS) receivers that collect and store position data describing the position of the camera at the time it acquired an image. These cameras, however, simply stamp the image data with the latitudinal and longitudinal coordinates which do not allow for easy recognition by others of the location where the image was acquired. They do not, for example, translate the coordinates into easily recognizable place names like "Cape Cod."

SUMMARY OF THE INVENTION

Methods, systems, and articles for manufacture consistent with the present invention overcome the shortcomings of existing systems by providing methods and means for labeling digital image data. According to one aspect of the invention, a digital image is acquired using a digital imaging device. A menu of descriptive terms is displayed to a user and the user selects at least one of the descriptive terms for association with the digital image file. In another aspect of the invention, an audio input device provides the digital imaging device with an audio signal containing at least one descriptive term. The descriptive term in the audio signal is associated with the digital image data file. In yet another aspect of the invention, a location determination device provides the digital imaging device with location information representing a geographic location where the digital image was acquired. The location information is associated with the digital image data file.

BRIEF DESCRIPTION OF THE DRAWINGS

The accompanying drawings, which are incorporated in and constitute a part of this specification, illustrate the invention and, together with the description, serve to explain the principles of the invention.

DETAILED DESCRIPTION

Reference will now be made in detail to an implementation consistent with the principles of the present invention as illustrated in the accompanying drawings. Wherever possible, the same reference numbers will be used throughout the drawings and the following description to refer to the same or like parts.

A. Introduction

Methods, systems, and articles of manufacture consistent with the present invention assist a user in archiving, indexing, sorting and retrieving stored image files by associating information relevant to the digital image with the image data file. In a digital imaging device equipped with an audio receiver, the user records audio information describing the digital image that is acquired. The descriptive audio information is converted to digital information that is used to label the image. The digitized descriptive information may be used, for example, to create a descriptive file name or print information on the image.

In an alternative embodiment, a digital imaging device is equipped with a location determination unit that provides location information to the digital imaging device. The location information may be converted to geographic coordinates, which may in turn be used to determine a place name or other descriptive term. The geographic coordinates, place name, or descriptive term may be used, for example, to create a descriptive file name or print information on the image.

B. Digital Cameras

Figure 1:
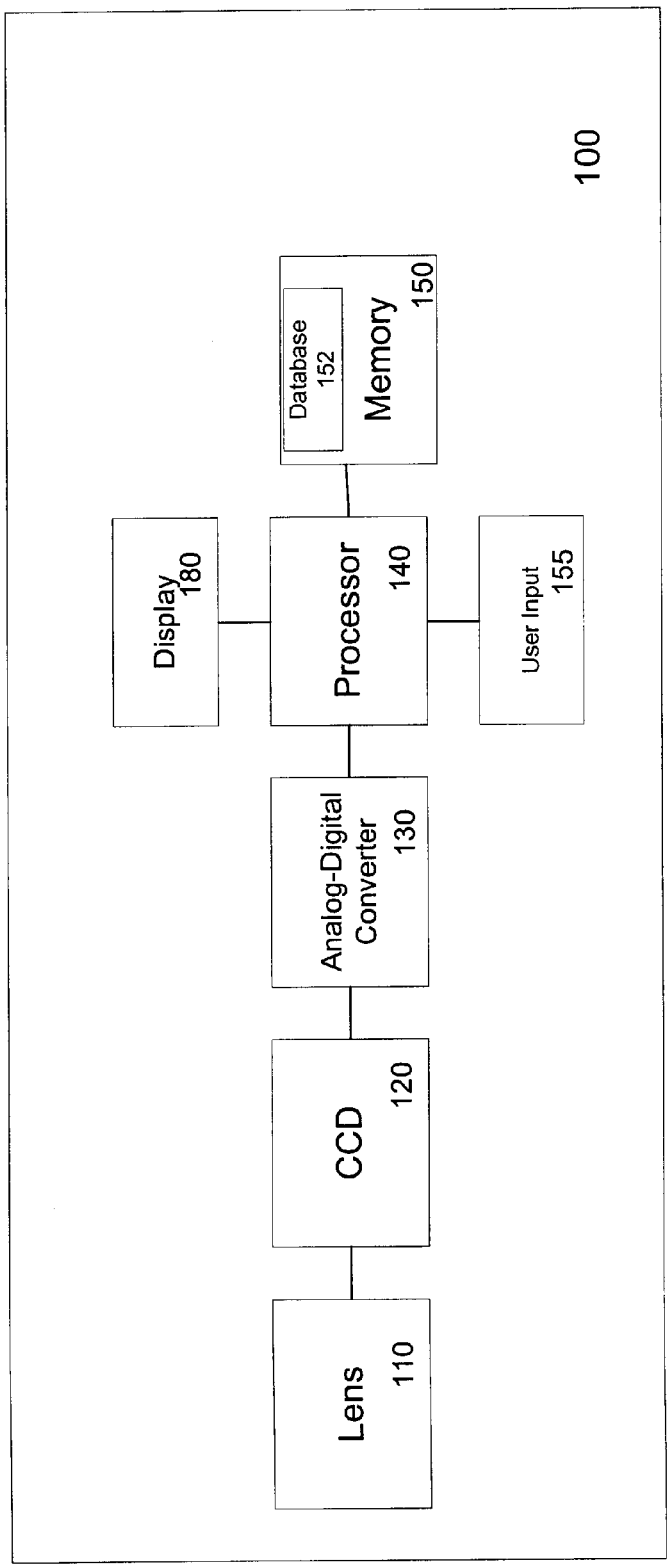
FIG. 1 is a block diagram of a digital camera consistent with the present invention.

FIG. 1 illustrates a system 100 consistent with the present invention. Digital camera 100 may be, for example, a digital still camera or a digital video camera. As shown in FIG. 1, digital camera 100 comprises a lens 110, a charge coupled device (CCD) 120, an analog-to-digital converter 130, a display 135, and a processor 140. Lens 110 is an optical lens formed of glass or plastic that focuses light on the surface of light-sensitive CCD 120. CCD 120 generates an electrical signal in accordance with an image provided by lens 110 and provides the electrical signal to analog-to-digital converter 130. Analog-to-digital converter 130 converts the analog image signal into digital information, which can be used to reproduce the acquired image, and transmits the digital information to processor 140.

Processor 140 may be any commonly available digital processor special purpose digital processor. Processor 140 may also store the image in a memory 150. Memory 150 may include any storage device capable of storing data processed by processor 140, including, for example, data base 152. Memory 150 may be, for example, a floppy disk, or other magnetic medium, or a blank RAM. Data base 152 may contain, for example, a dictionary of words, place names, events, or other descriptive terms.

Processor 140 is also connected to at least one user input device 155 via any suitable data connection. User input device 155 can be any device capable of passing information to or receiving data from processor 140. By way of example only, user input device 155 may be a scroll wheel, button, key, or other suitable means of accepting input from a user. Digital camera 100 may also include a display 180, such as a cathode ray tube (CRT) or liquid crystal display (LCD), for displaying information.

Figure 2:
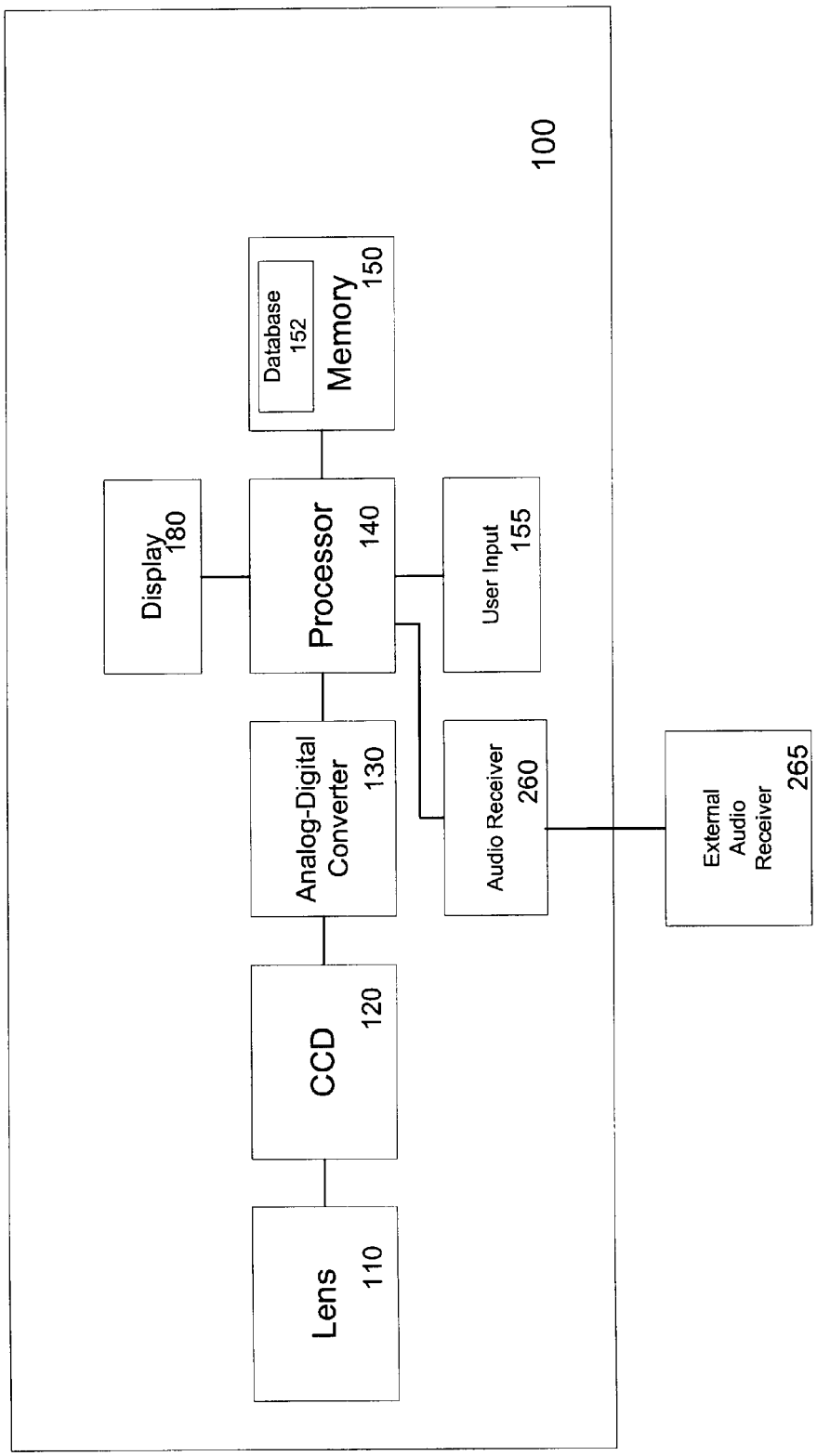
FIG. 2 is a block diagram of a digital camera with audio receiver consistent with the present invention.

Consistent with the present invention, digital camera 100 may also include an audio receiver 265, such as a microphone, as shown in FIG. 2. Audio receiver 265 may be located physically inside camera 100 or externally attached as a peripheral device, such as audio receiver 265. Audio receiver 265 may be operatively connected to an optional recorder 260 or other means of recording audio received from audio receiver 265. In implementations without optional recorder 260, audio may be stored in memory 150.

Figure 3:
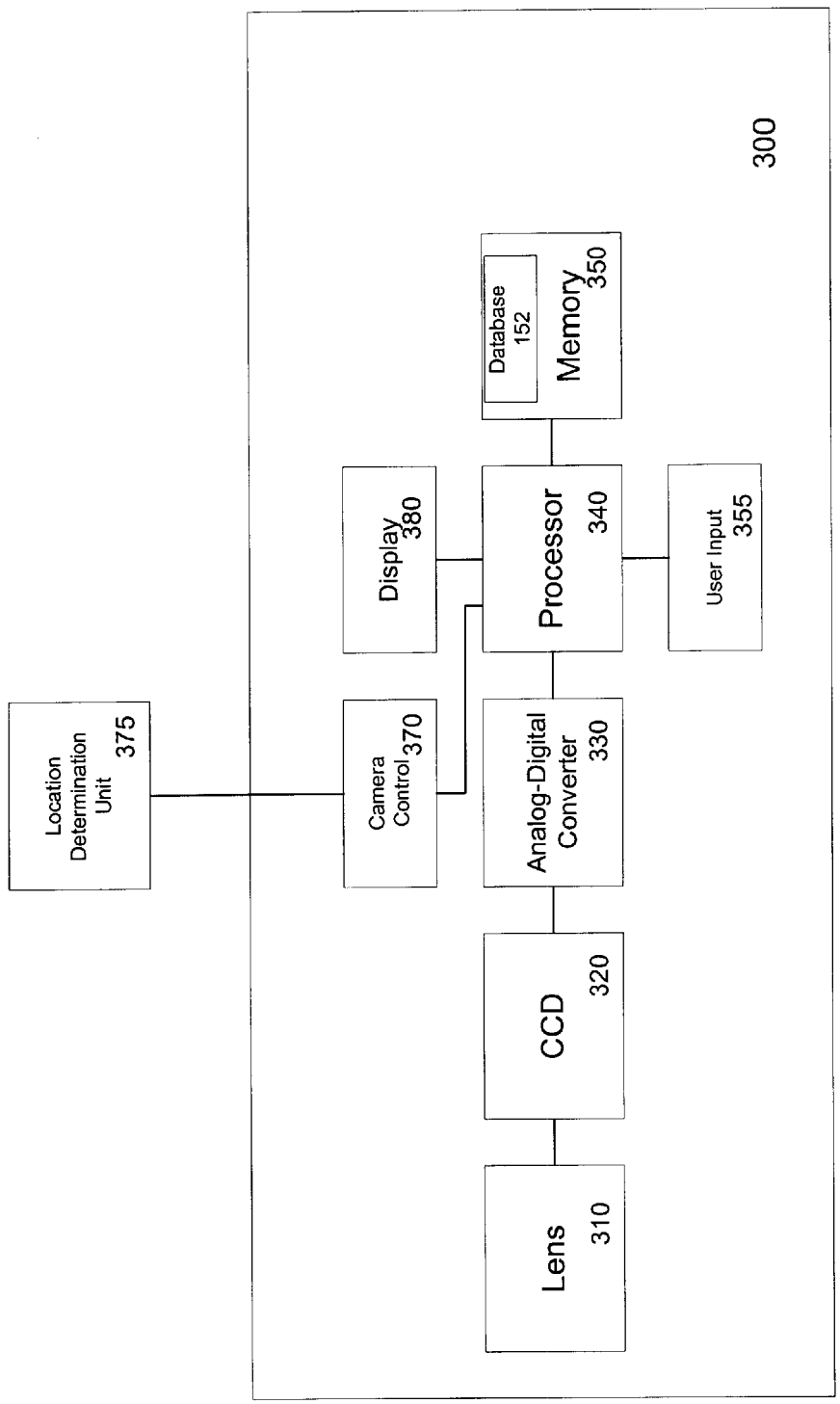
FIG. 3 is a block diagram of a digital camera with location determination unit consistent with the present invention.

FIG. 3 is a block diagram of a digital camera 100 with a location determination unit 375. Location determination unit 375 may be external to camera 100 as shown in FIG. 3 or located inside camera 100. Location determination unit 375 tracks the camcorder's location via signals collected by an antenna. Location determination unit 375 may be, for example, a conventional global positioning satellite (GPS) receiver. Location determination unit 375 is capable of outputting information such as time, position, and velocity to camera 100. Location determination unit 375 optionally may comprise or be operatively connected to a memory containing a database of geographic coordinates and familiar places names. Location determination unit 375 may obtain a place name corresponding to the geographic coordinates by, for example, comparing the coordinates to the information in the database and determining the closest location.

Location determination unit 375 passes the location information (such as the coordinates or place name) to camera control 370. Camera control 370 is operatively connected to processor 340 and passes location information to processor 340. As described above, processor 340 is operatively connected to memory 350 which may contain a database of geographic coordinates and familiar places names. Processor 340 may obtain a place name corresponding to the geographic coordinates by, for example, comparing the coordinates to the information in the database and determining the closest location. Processor 340 may also contain a character generator that produces a bit map of the text information.

C. Methods of Associating Descriptive Data with an Image File

Figure 4:
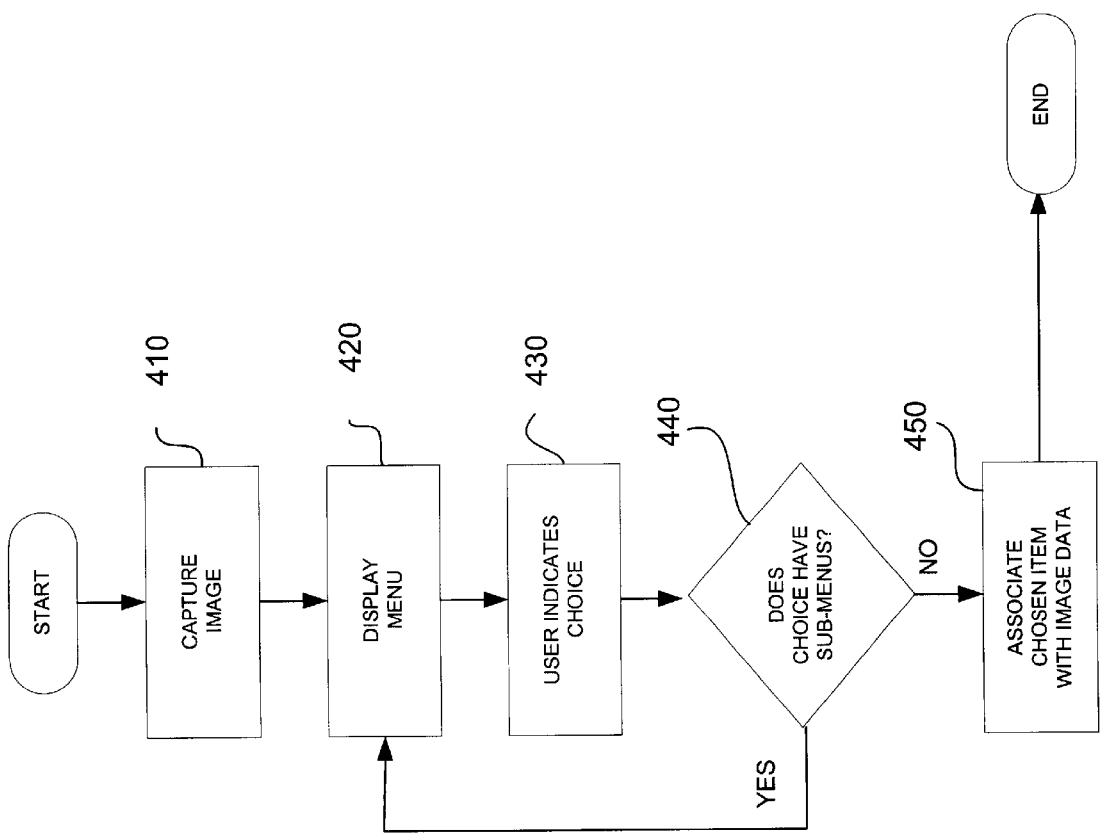
FIG. 4 is a flow diagram illustrating a method consistent with the present invention.

FIG. 4 is a flow chart illustrating a process of associating descriptive data with a digital image file consistent with the present invention. At some point in the process an image is acquired (stage 410). After the image is acquired, a menu is displayed to the user (stage 420). To display the menu, a user may activate the menu manually by, for example, pushing a button on the camera, or by speaking a command. In another embodiment, the menu is automatically activated by the act of acquiring an image.

Figure 5:
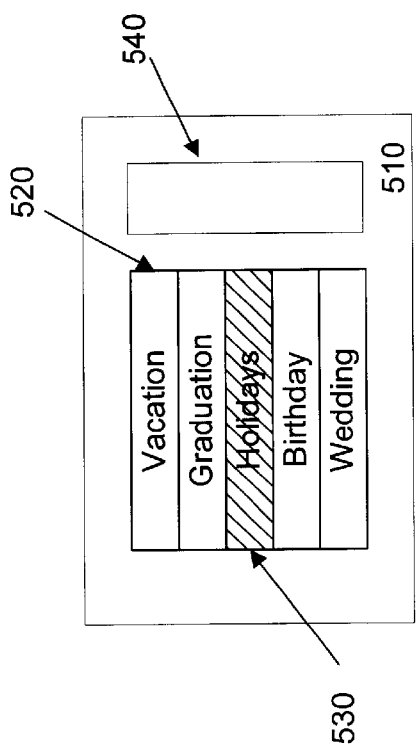
FIG. 5 is a diagram of a digital camera consistent with the present invention.

FIG. 5 shows a back of an imaging device that is consistent with the present invention. As shown in FIG. 5, display front 510 may contain display area 520 and user input area 540. Display area 520 displays a list of menu items. Menu items may be, for example, descriptive terms, categories of content, relationships, or stored information created by the user. The content of image files may be categorized based on events (such as BIRTHDAY, VACATION, GRADUATION) or relationships of subjects in the images (such as MOM, DAD, SON, FRIEND). User input area 540 may comprise, for example, one or more buttons or scroll wheels for scrolling through the choices until the user's choice is highlighted. User input area 540 also may be digital representations of buttons, keys, or a scroll wheel as displayed, for example, on an LCD display. User input area 540 may also include a means for accepting voice commands, such as a microphone connected to a voice synthesizer.

Figure 6:
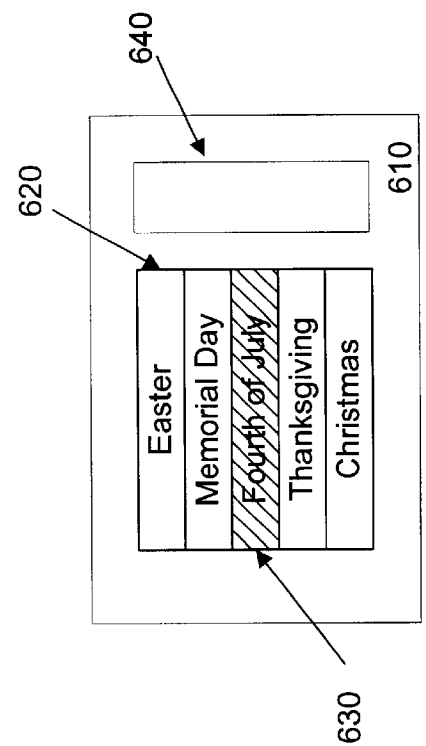
FIG. 6 is a diagram of a digital camera consistent with the present invention.

In FIG. 5, for example, the user has highlighted the choice, "Holidays." While the menu is displayed to the user, the user indicates one or more of the displayed items by, for example, manipulating a scroll wheel, pushing a button, or speaking a command. If the choice indicated by the user has sub-menus, the list of items in the sub-menu is displayed when the choice is indicated (stage 420) and the user must again indicate a choice (stage 430). As shown in FIG. 6, for example, once the user has indicated the choice "Holidays," a list of holidays appears in the display.

If the user's choice, as indicated in step 430, does not have sub-menus, text corresponding to the user's choice is associated with the image data file (stage 450). The text may be used, for example, as a descriptive file name, such as "4thofjuly.jpg." If more than one item has been chosen, the file name may become, for example, "VACATION$_{13}$ 4thofjuly_070498_jpg." In another embodiment consistent with the present invention, the text may be printed as a legend on the image, either in the form as stored (e.g. VACATION_4thofjuly_070498_jpg) or expanded to a more meaningful form, such as "VACATION, Fourth of July, Jul. 4, 1998, 6:23:50 P.M." The descriptive information may be converted to a bit map of characters, with appropriate masking information added to the digital image file. The processor, for example, may composite the "Fourth of July" legend bit map onto the video image. The resulting composited image will be displayed on the camera viewfinder and/or stored to memory.

Figure 7:
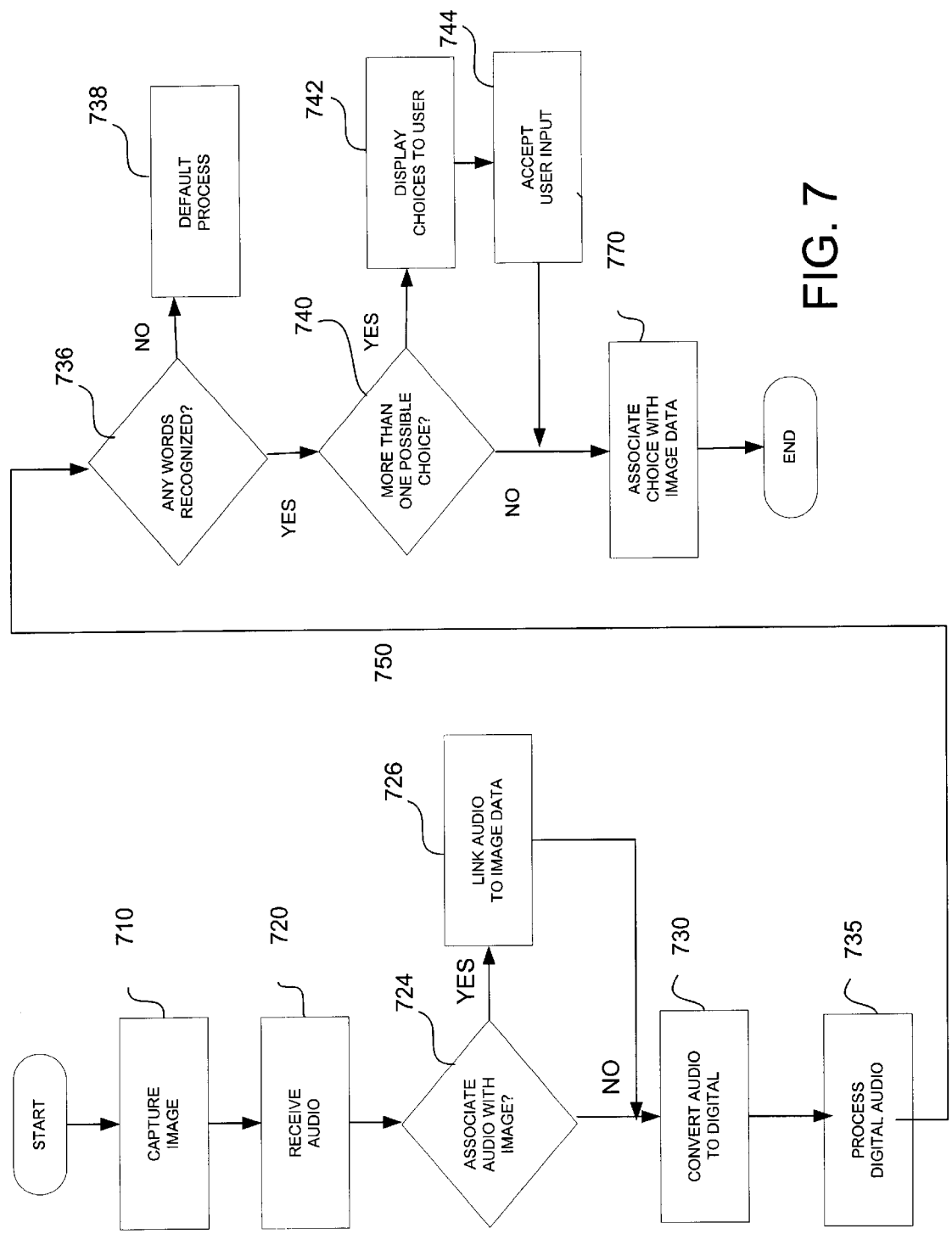
FIG. 7 is a flow diagram of a method of associating audio data with a digital image file consistent with the present invention.
Figure 8:
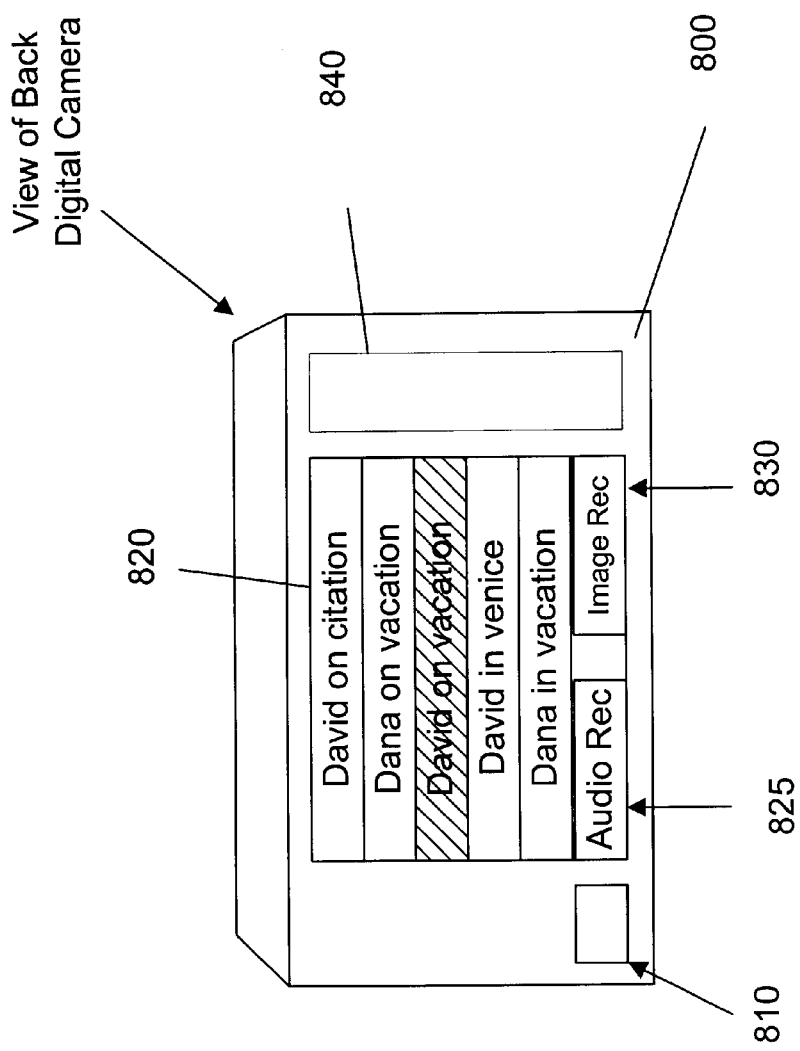
FIG. 8 shows a diagram of a digital camera consistent with the present invention.

Consistent with the present invention, a digital imaging device may also receive information from an audio input device. FIG. 7 is a flow chart illustrating a process of associating descriptive data obtained from an audio receiver with a digital image file. FIG. 8 shows a view of the back of a digital camera 800. Consistent with the present invention, audio information is associated with digital image data. At some point in the process an image is acquired (stage 710). Before, during, or after the image is acquired, a user, or subsequent user, receives audio to be associated with the image file (stage 720). The audio may be received by, for example, speaking into audio receiver 265 attached to digital camera 100 or audio receiver 810 located in digital camera 800. In another exemplary embodiment, the audio is received later, when subsequently processing or recalling the image files, by using a microphone or other audio input device attached to a processing computer. The audio may be received at the time of shooting or added later, when the image file is processed or recalled.

The audio may contain such content as a person commenting on the image he is shooting, for example "David on vacation in Washington D.C." If the audio should be associated with the image file as is (stage 724), the audio is linked to the image data (stage 726) and may subsequently be recalled and replayed when the digital image file is recalled.

Alternatively, the audio may be converted to a digital audio file (stage 730). The digital audio file may be stored and subsequently recalled and replayed when the digital image file is recalled. The digital audio file may also be processed, for example, using voice recognition software either in the digital camera or in any computer that is subsequently processing the image file (stage 735). If the voice recognition process results in more than one possible choice (stage 740), the choices may be displayed to the user (stage 742). The user may indicate a choice by, for example, manipulating a scroll wheel or using buttons, such as those provide in user input areas 540 of FIG. 5 or 640 of FIG. 6.

If the voice recognition process does not recognize words in the digital audio file as words in the chosen language (stage 736), the process may proceed with a default process for determining a file name (stage 738). If, however, words in the data base are recognized, the process proceeds with step 740. The words may be used as is or, alternatively, compared to a list of words in a data base. For example, the words recognized by the voice recognition software may be compared against a data base of words commonly used to describe images, such as "David, "vacation" and Washington, D.C." either provided by the manufacture as part of the image. The use of a common words data base may prevent the file from being named by other nondescriptive words that the voice recognition software may recognize, such as "in, "the," and "a." Descriptive words may be used to create a file name, such as "DAVID_VACATION_WASHINGTON_DC.jpg," file tag, or overlay for displaying on the image file (such as "David in vacation in Washington, DC"). Once again software in the computer could search the database of image files for a file name with a key word like "David" or "Vacation".

If more than one word in the data base is recognized (stage 740), the words are displayed to the user (stage 742). In FIG. 8, for example, the voice recognition process resulted in five close matches. User input area 840 may comprise, for example, one or more buttons or scroll wheels for scrolling through the choices until the user's choice is highlighted. User input area 840 also may be digital representations of buttons, keys, or a scroll wheel as displayed, for example, on an LCD display. In FIG. 8, for example, the user has highlighted the choice, "David on vacation." Once the user has indicated the choice "David on vacation," the user's input is accepted (stage 744), and the text corresponding to the user's choice is associated with the image data (stage 770). The descriptive label may be used, for example, as a descriptive file name, such as "david_acation.jpg."

In another embodiment consistent with the present invention, the file name is printed inconspicuously on the image, either in the form as stored (e.g. VACATION_4thofjuly_070498_jpg) or expanded to a more meaningful form, such as "VACATION, Fourth of July, Jul. 4, 1998, 6:23:50 P.M." The descriptive information may be converted to a bit map of characters, with appropriate masking information added to the digital containing the descriptive information image file. Masking information is a set of instructions on how to combine the image with the digital image file. The processor, for example, may composite the "Fourth of July" bit map onto the video image. The resulting composited image will be displayed on the camera viewfinder and/or stored to memory.

Figure 9:
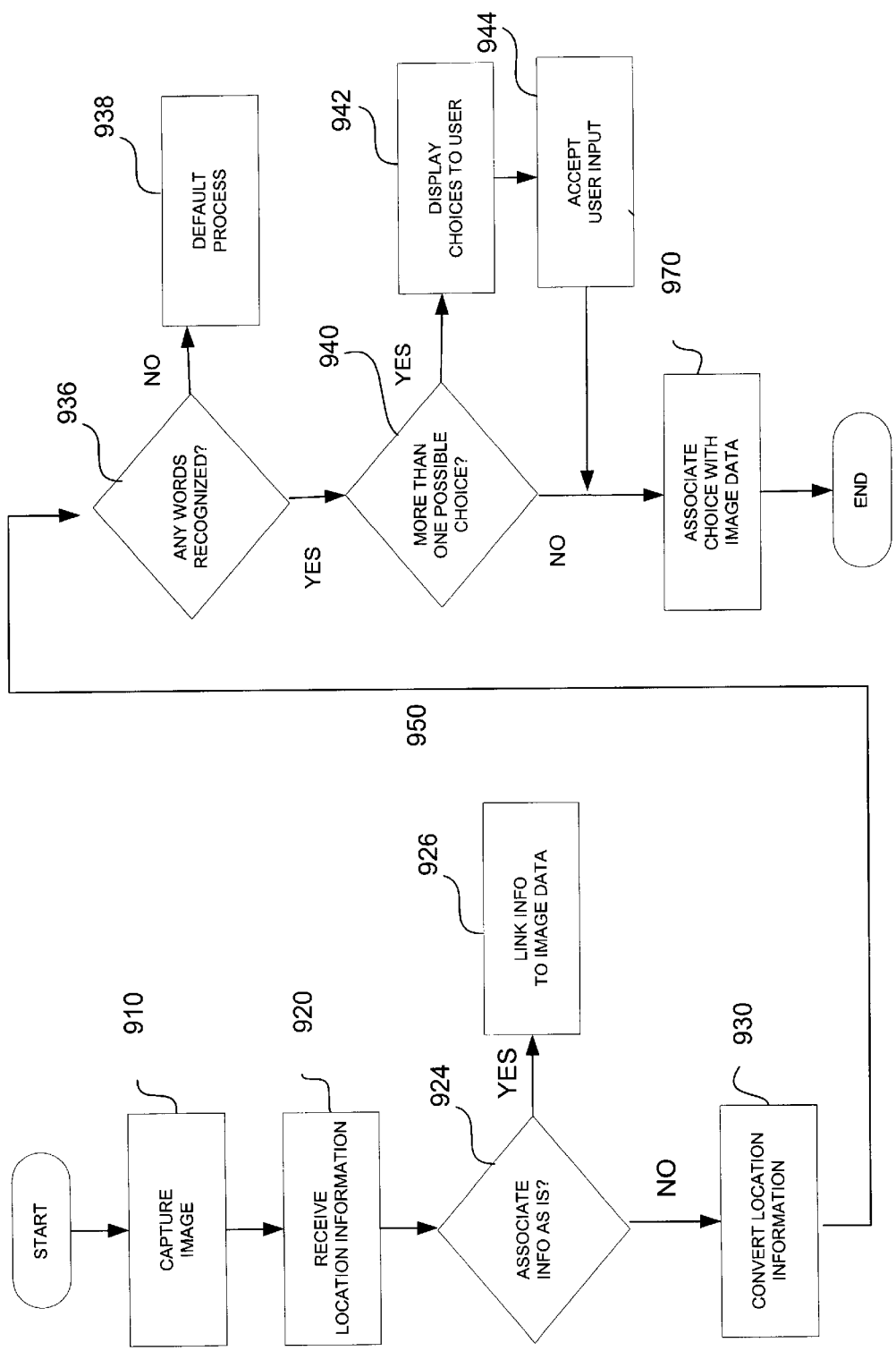
FIG. 9 is a flow diagram of a method of associating location information data with a digital image file consistent with the present invention.

In yet another embodiment consistent with the present invention, a digital imaging device may also receive information from a location determination device, such as a GPS. FIG. 9 a flow chart illustrating a process of associating descriptive data obtained from an location determination device with a digital image file.

Consistent with the present invention, a digital imaging device acquires an image (stage 910). The digital imaging device also receives location information from a location determination device, such as a GPS (stage 920). The location information received may be, for example, longitudinal and latitudinal coordinates of the location of the camera when the image was acquired. The coordinates may be associated with the file as is (stage 924), in which case the coordinates are simply linked to the image data (stage 926).

If not associated as is, the location information may be converted to textual location information (stage 930). For example, the longitudinal and latitudinal coordinates may be used to obtain a city or location name derived from map data by using a look-up table of names associated with coordinates. The coordinate information may also be used to obtain graphical map information derived from the map data, supplied to the device on, for example, a replaceable memory cartridge.

The location coordinates may be compared, for example, to entries in a location data base stored in memory. The location data base may contain, for example, global location coordinates and alphanumeric place names such as "Orlando, Fla." or "Manhattan, N.Y." If the coordinates do not correspond exactly to any location in the data base (stage 936), the process may default (stage 938). Alternatively, the process may choose multiple entries with coordinates near the given coordinates (stage 940) and display the list of place names to the user (stage 942). If the coordinates correspond to more than one place name, such as "Manhattan, N.Y." and "Radio City Music Hall," or alphanumeric place name, all entries may be displayed to the user. The user then indicates which of the place names should be associated with the particular image file (stage 944). The user may, for example, scroll through the choices using a scroll wheel or indicate a choice using buttons on the camera. The alphanumeric place name may be, for example, imprinted on the printed photo, used to generate the file name, as in MANHATTAN.JPEG.

D. Conclusion

The foregoing description of implementations of the invention have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. The scope of the invention is defined by the claims and their equivalents.

What is claimed is:

1. A method for labeling digital image data comprising:

acquiring a digital image;

receiving numeric geographic coordinates from a location determination device;

displaying a menu of at least one alphanumeric location label corresponding to points near the location corresponding to the numeric geographic coordinates;

receiving an input from a user to select at least one of the at least one alphanumeric location label in the menu; and associating the at least one selected alphanumeric location label with an image data file containing the digital image.

2. A method for labeling digital image data comprising:

acquiring a digital image;

receiving numeric geographic coordinates from a location determination device;

displaying the at least one alphanumeric location label to a user;

receiving an indication from the user selecting at least one alphanumeric location label; and associating the at least one selected alphanumeric location label with an image data file containing the digital image.

3. A digital imaging device, comprising:

a lens system that acquires a digital image;

an imager device for converting the image to a digital image signal;

a location determination device that generates location information representing a geographic location where the digital image was acquired;

a memory for storing a data base of alphanumeric location labels; and a processor for
   determining at least one alphanumeric location label corresponding to the numeric geographic coordinates; and
   associating the at least one alphanumeric location label with an image data file containing the digital image signal;

a display for displaying a menu of the at least one alphanumeric location label; and a user input mechanism for allowing a user to select at least one of the at least one alphanumeric location labels in the menu.

4. The digital imaging device of claim 3, wherein the location determination device generates a file name for the image data file based the at least one alphanumeric location label.

5. The digital imaging device of claim 3, further comprising:

a second processor for linking the at least one alphanumeric location label with the digital image; and a display for displaying the at least one alphanumeric location label with the digital image, when the digital image is displayed.

6. A computer-readable medium containing instructions for controlling a computer system to perform a method, the computer system having a group of data structures reflecting a logical structure of a data source, the method comprising:

acquiring a digital image;

receiving numeric geographic coordinates from a location determination device;

displaying a menu of at least one alphanumeric location label corresponding to points near the location corresponding to the numeric geographic coordinates;

receiving an input from a user to select at least one of the at least one alphanumeric location label in the menu; and associating the at least one selected alphanumeric location label with an image data file containing the digital image.

7. A computer-readable medium containing instructions for controlling a computer system to perform a method, the computer system having a group of data structures reflecting a logical structure of a data source, the method comprising:

acquiring a digital image;

receiving numeric geographic coordinates from a location determination device;

determining at least one alphanumeric location label corresponding to the numeric geographic coordinates;

displaying the at least one alphanumeric location label to a user;

receiving an indication from the user selecting at least one alphanumeric location label in the menu; and associating the at least one selected alphanumeric location label with an image data file containing the digital image.

* * * * *

UNITED STATES PATENT AND TRADEMARK OFFICE
CERTIFICATE OF CORRECTION

PATENT NO.    : 6,462,778 B1
DATED         : October 8, 2002
INVENTOR(S)   : Philip Michael Abram and Robert J. Sato It is certified that error appears in the above-identified patent and that said Letters Patent is hereby corrected as shown below:

Column 8,
Line 6, "based the" should read -- based on the --.

Signed and Sealed this

Eighteenth Day of February, 2003

JAMES E. ROGAN
*Director of the United States Patent and Trademark Office*